July 2, 1968 D. A. SHELTON 3,390,916
FASTENING MEANS FOR VEHICLE WHEELS
Filed April 4, 1966 2 Sheets-Sheet 1
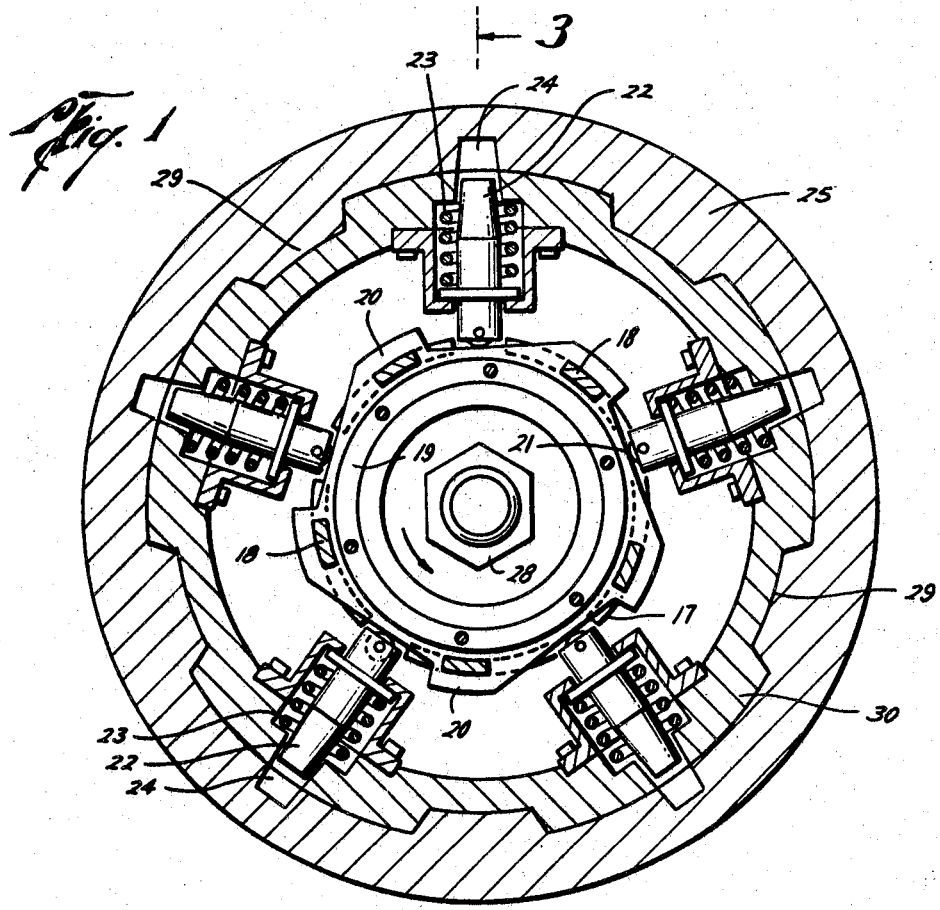
Fig. 1
Fig. 2
Don A. Shelton
INVENTOR.
BY
ATTORNEY July 2, 1968   D. A. SHELTON   3,390,916
FASTENING MEANS FOR VEHICLE WHEELS
Filed April 4, 1966   2 Sheets-Sheet 2
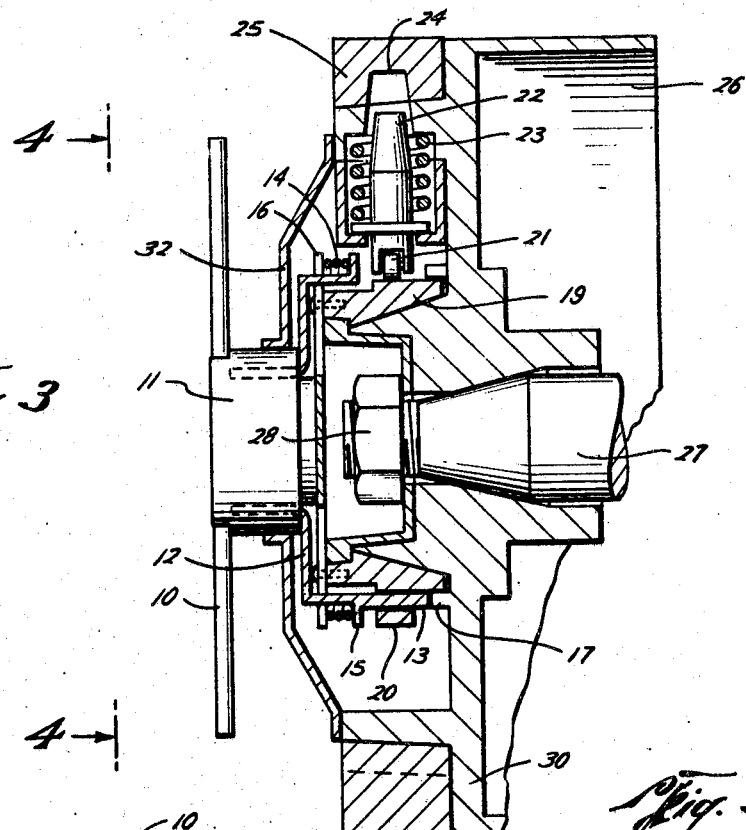
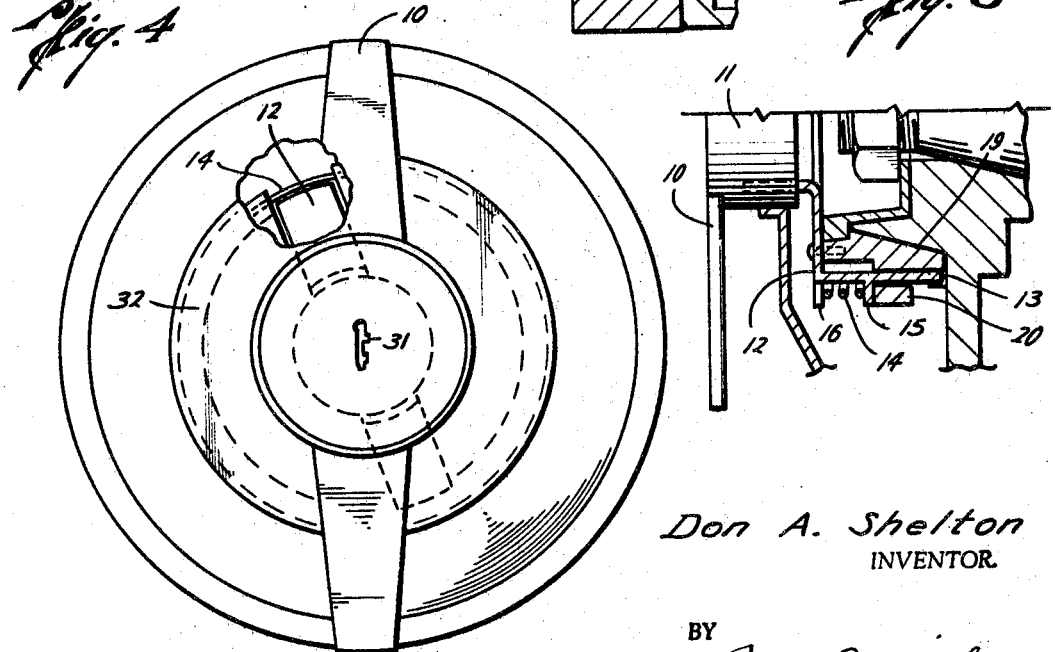
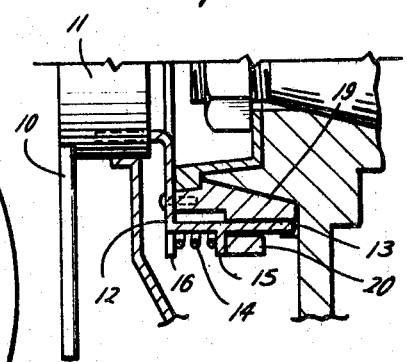
Don A. Shelton
INVENTOR.
BY Ramon A. Kletzke
ATTORNEY

United States Patent Office 3,390,916
Patented July 2, 1968

3,390,916
FASTENING MEANS FOR VEHICLE WHEELS
Don A. Shelton, 3609 McGowan,
Houston, Tex. 77004
Filed Apr. 4, 1966, Ser. No. 539,816
2 Claims. (Cl. 301—9)

ABSTRACT OF THE DISCLOSURE

A detachable wheel locking assembly having radially positioned sliding locking pins and external means for slideably actuating the pins and thereby locking a wheel assembly to a wheel brake drum.

---

The invention relates in general to fastening means for vehicle wheels and more particularly to new and useful improvements in wheel assemblies of the quickly detachable type.

An object of this invention is to provide a readily detachable vehicle wheel assembly not involving threaded bolts and nuts.

Another object of this invention is to provide a detachable vehicle wheel assembly which can be fastened to, and removed from, the vehicle with a minimum amount of effort and exertion.

Another object of this invention is to provide a vehicle wheel assembly which can be locked onto the vehicle so as to prevent unauthorized removal thereof.

Another object of this invention is to provide a wheel assembly which can be locked onto a vehicle by means of retractable cylinders or pins such that the assembly is both safely and securely locked in place.

Another object of this invention is to provide a rotatable cam plate for actuation of said retractable pins and actuating and locking means for such cam plate.

Other objects and advantages of the invention will appear as the invention is more particularly described and explained in the accompanying drawings. In the drawings reference numerals which are alike in the several views denote corresponding like parts.

FIG. 1 is a plan view of the detachable wheel assembly and locking ring with part of the assembly removed so as to show the internal parts of the assembly. FIG. 1 is in part a sectional view.

FIG. 2 shows one-quarter of the FIG. 1 plan view with a typical locking pin in the locked, instead of the unlocked, position.

FIG. 3 is a cross-sectional view taken on line 3—3 in FIG. 1.

FIG. 4 is a plan view of the mechanism, taken along line 4—4 in FIG. 3, and showing the outer portion of the entire wheel locking assembly.

FIG. 5 shows a part of FIG. 3 with the assembly in the locked, instead of the unlocked, position.

The several members of the wheel locking mechanism will now be described in detail with reference to the drawings. In the illustrated embodiment of the invention, exterior operating handles 10 are rigidly secured, by means of collar 11, to the locking member 12, which has a plurality of finger-like extensions 13. This particular example of the invention shows a mechanism with five (5) such extensions, but the number is not critical. Locking member 12 is rotatably mounted within the assembly and is rotated by turning exterior handles 10.

A spiral spring 14 is positioned in the annular recess formed between the circular flange 15, which is a part of the locking member 12, and the circular plate 16. The spring 14 exerts pressure upon flange 15 so as to press the extension 13 against the semicircular shoulders 17 when the assembly is in the open or unlocked position, as shown in FIGS. 1 and 3, and into the recesses between the semicircular shoulders 17 when the assembly is in the closed or locked position, as shown in FIGS. 2 and 5.

Extensions 13 extend through rectangular openings 18 in the circular cam ring 19. Said openings may be approximately the same cross-sectional size as that of the individual extensions 13. Circular cam ring 19 has a plurality of extending cams 20 at its peripheral edge and it is upon these cams that rollers 21 run.

Said rollers 21 comprise the undercarriage of the individual locking pins 22 and the rollers are held against cams 20 by means of individual springs 23. Pins 22 slide into cylindrical recesses 24 when the assembly is in the locked position, as shown in FIG. 2, and slide out of said recesses 24 when the assembly is in the open position, as shown in FIGS. 1 and 3.

Cylindrical recesses 24 are formed in annular ring 25, to which is rigidly attached the wheel rim and tire of the vehicle. The wheel locking assembly is rigidly attached to, and is a part of, the wheel brake drum 26, which is secured to the vehicle axle 27 by locking nut 28.

The mechanical operation of the invention will now be illustrated to show the combination of the various members. The assembly being in the open position, as shown in FIGS. 1 and 3, annular ring 25, which is a part of the wheel rim and tire, is slid onto the locking assembly. To accomplish this, the tire and rim must be turned so that the offset shoulders 29 are in line with corresponding identically-shaped recesses in mounting 30, part of which forms the brake drum 26. As rim, tire and annular ring 25 are slipped onto mounting 30, cylindrical recesses 24 will be required to be positioned in line with the paths of motion of the individual locking pins 22. Exterior handles 10 can now be turned in a counterclockwise direction, with reference to FIGS. 1 and 4. Extensions 13 will be forced against a side of each of the rectangular openings 18 in the circular cam ring 19. Referring to FIG. 1, as the cam ring turns in a counterclockwise direction, locking pin rollers 21 will run up the individual extending cams 20 and the pins will be slid into the cylindrical recesses 24, thus fastening annular ring 25, with the rim and tire thereon.

Referring to FIG. 1, when rollers 21 are positioned at the tops of the cams 20, extension 13 will have moved to the recesses between the semicircular shoulders 17 and will be forced into said recesses by spring 14. The mechanism will now be locked so that exterior handles 10 cannot be turned. FIG. 4 shows a keyhole 31, which can be a part of a cylinder lock positioned within collar 11. The exterior handles 10 can be rigidly connected to locking member 12 directly and collar 11 can be rigidly connected to the wheel cover 32 so as to be nonrotatable. With this arrangement, operation of locking bolts in the cylinder lock can be utilized so as to key-lock the mechanism in the closed position and thus prevent removal of the tire and rim without first opening the cylinder lock.

To open the mechanism, the cylinder lock, if any, must first be unlocked, and then the exterior handles 10 must be pulled in a direction away from the wheel so as to lift extensions 13 out of the recesses between the semicircular shoulders 17. When the extensions have been pulled out of said recesss, exterior handles 10 can be rotated in a clockwise direction, with reference to FIGS. 1 and 4, so as to withdraw the locking pins 22 from the cylindrical recesses 24 in the ring 25. This will enable the ring 25, tire and rim to be slipped off of the wheel.

The foregoing description comprises a preferred practical and efficient embodiment of the invention but it can be seen that modifications can be made therein without departing from the essence of the invention and it is not intended that the invention be limited to the exact construction and arrangement shown and described.

What is claimed is:

1. A detachable wheel locking assembly comprising a detachable outer annular ring rigidly attached to the wheel rim and having offset shoulders in its inner edge and radially directed cylindrical recesses extending from said inner edge, an inner mounting rigidly attached to the wheel brake drum having offset recesses matching the offset shoulders of said annular ring, slidable spring-actuated locking pins positioned in a radial direction at the periphery of said mounting, one pin at each of the cylindrical recesses, an annular cam ring concentric with said inner mounting and having sloping cams in contact with the inner ends of said locking pins, an annular locking member having finger-like extensions extending through matching openings in said cam ring and rotatably and slidably mounted around the axis of said mounting, semi-circular shoulders rigidly attached to said mounting, concentric with the axis of said mounting and positioned at the ends of said finger-like extensions, recessed spaces between said semi-circular shoulders positioned so that when said extensions are spring-forced into said recesses the cams have forced the locking pins into the cylindrical recesses of the outer annular ring, means for rotatably directing said annular locking member and means for locking said locking member when the extensions are positioned in the recesses between said semi-circular shoulders.

2. A detachable wheel locking assembly for a wheel which is locked onto the vehicle axle with locking nuts comprising an outer annular wheel rim ring having offset shoulders on its inner edge and having cylindrical recesses extending radially from its inner edge, an inner mounting locked onto the axle by one of said locking nuts and rigidly attached to the vehicle brake drum, said mounting having slidable spring-actuated locking pins positioned radially at its periphery so that each locking pin is adjacent to one of said cylindrical recesses when said outer rim is positioned around said inner mounting, offset recesses in the outer edge of said inner mounting which match said offset shoulders on said outer ring, an annular cam ring rotatably mounted concentric with said inner mounting and having sloping cams in slidable contact with the inner ends of said locking pins, an annular locking member rotatably mounted concentric with said inner mounting and having finger-like extensions extending through matching openings in said cam ring, semi-circular shoulders concentric with said inner mounting and rigidly attached thereto, spring means to force said finger-like extensions into sliding contact with said shoulders, recessed spaces between said shoulders into which said extensions fit, a cylindrical collar rigidly attached to said locking member, and concentric with said inner assembly, a cylinder key-lock positioned within said collar so that when the lock is locked the collar is not rotatable and external means for rotating said collar.

References Cited

UNITED STATES PATENTS

| | | | |
|---|---|---|---|
| 1,707,458 | 4/1929 | Clench | 301—9 |
| 1,728,262 | 9/1929 | Clench | 301—21 |
| 2,289,448 | 7/1942 | Monroe | 301—9 |
| 2,490,486 | 12/1929 | Spurlock | 301—9 |

RICHARD J. JOHNSON, *Primary Examiner.*